(12) United States Patent
Falls et al.

(10) Patent No.: US 12,263,752 B2
(45) Date of Patent: Apr. 1, 2025

(54) VEHICLE FRAME AND POWER SUPPLY ASSEMBLY AND RELATED SYSTEMS AND METHODS

(71) Applicant: AVL Mobility Technologies, Inc., Plymouth, MI (US)

(72) Inventors: Bruce Falls, Dove Canyon, CA (US); Adrian Quintana, Foothill Ranch, CA (US); Alwin Lutz, Aliso Viejo, CA (US); Scott Kochan, San Jose, CA (US); Brian Moran, Rancho Santa Margarita, CA (US)

(73) Assignee: AVL Mobility Technologies, Inc., Plymouth, MI (US)

( * ) Notice: Subject to any disclaimer, the term of this patent is extended or adjusted under 35 U.S.C. 154(b) by 514 days.

(21) Appl. No.: 16/893,507

(22) Filed: Jun. 5, 2020

(65) Prior Publication Data

US 2020/0384882 A1 Dec. 10, 2020

Related U.S. Application Data

(60) Provisional application No. 62/857,689, filed on Jun. 5, 2019.

(51) Int. Cl.
*B60L 53/80* (2019.01)
*B60L 3/04* (2006.01)
(Continued)

(52) U.S. Cl.
CPC ............. *B60L 53/80* (2019.02); *B60L 3/04* (2013.01); *B60L 50/64* (2019.02); *B60L 50/66* (2019.02);
(Continued)

(58) Field of Classification Search
CPC ........... H01M 10/4257; H01M 10/482; H01M 10/486; H01M 50/204; H01M 50/271;
(Continued)

(56) References Cited

U.S. PATENT DOCUMENTS

| | | | |
|---|---|---|---|
| 4,522,898 A | 6/1985 | Esrom | |
| 5,392,873 A | 2/1995 | Masuyama et al. | |

(Continued)

FOREIGN PATENT DOCUMENTS

| | | |
|---|---|---|
| AU | 2010298629 B2 | 11/2014 |
| CN | 102310829 A | 1/2012 |

(Continued)

OTHER PUBLICATIONS

European Patent Office (ISA), International Search Report and Written Opinion for PCT App. No. PCT/US2020/036236, mailed Nov. 2, 2020.

(Continued)

*Primary Examiner* — Karie O'Neill Apicella
(74) *Attorney, Agent, or Firm* — Honigman LLP; Matthew H. Szalach

(57) ABSTRACT

A system includes data processing hardware and memory hardware. The memory hardware is in communication with the data processing hardware and stores instructions that when executed on the data processing hardware cause the data processing hardware to perform certain operations. The operations include receiving a temperature corresponding to a battery, and determining whether the temperature is greater than a predetermined threshold temperature. The operations also include, when the temperature is greater than the predetermined threshold temperature, actuating an ejector to eject the battery from a power supply assembly.

10 Claims, 6 Drawing Sheets

(51) Int. Cl.

| | |
|---|---|
| *B60L 50/60* | (2019.01) |
| *B60L 50/64* | (2019.01) |
| *B60L 58/10* | (2019.01) |
| *B60L 58/24* | (2019.01) |
| *B62D 21/09* | (2006.01) |
| *H01M 10/42* | (2006.01) |
| *H01M 10/48* | (2006.01) |
| *H01M 50/204* | (2021.01) |
| *H01M 50/249* | (2021.01) |
| *H01M 50/271* | (2021.01) |
| *H02J 7/00* | (2006.01) |
| *H01M 50/264* | (2021.01) |

(52) U.S. Cl.
CPC .............. *B60L 58/10* (2019.02); *B60L 58/24* (2019.02); *B62D 21/09* (2013.01); *H01M 10/4257* (2013.01); *H01M 10/482* (2013.01); *H01M 10/486* (2013.01); *H01M 50/204* (2021.01); *H01M 50/249* (2021.01); *H02J 7/0013* (2013.01); *H02J 7/0029* (2013.01); *H02J 7/00309* (2020.01); *H02J 7/0045* (2013.01); *B60L 2240/545* (2013.01); *H01M 2010/4271* (2013.01); *H01M 2010/4278* (2013.01); *H01M 50/264* (2021.01); *H01M 50/271* (2021.01); *H01M 2200/00* (2013.01); *H01M 2220/20* (2013.01)

(58) Field of Classification Search
CPC .. B60L 58/24; B60L 58/10; B60L 3/04; H02J 7/0013; H02J 7/0045
See application file for complete search history.

(56) References Cited

U.S. PATENT DOCUMENTS

| | | |
|---|---|---|
| 8,570,047 B1 | 10/2013 | Davies et al. |
| 10,003,112 B1 | 6/2018 | Boor et al. |
| 2003/0203782 A1 | 10/2003 | Casey et al. |
| 2004/0200648 A1 | 10/2004 | Tarasinski et al. |
| 2008/0231257 A1 | 9/2008 | Williams |
| 2011/0075960 A1 | 3/2011 | White et al. |
| 2011/0101916 A1 | 5/2011 | Densham et al. |
| 2012/0223113 A1 | 9/2012 | Gaisne et al. |
| 2012/0321927 A1 | 12/2012 | Loo et al. |
| 2013/0333959 A1 | 12/2013 | Wagemann et al. |
| 2014/0245862 A1 | 9/2014 | Lang et al. |
| 2014/0330471 A1 | 11/2014 | Ozaki |
| 2015/0357684 A1* | 12/2015 | Willgert ............ H01M 50/213 320/112 |
| 2016/0178041 A1 | 6/2016 | Hagman |
| 2016/0377162 A1 | 12/2016 | Ziskovsky et al. |
| 2017/0114422 A1 | 4/2017 | Connolly et al. |
| 2018/0162221 A1 | 6/2018 | Long et al. |
| 2018/0337435 A1 | 11/2018 | Staudenmaier |
| 2018/0345778 A1 | 12/2018 | Yamanaka |
| 2019/0074699 A1* | 3/2019 | Yano ..................... H02J 1/102 |
| 2019/0118649 A1 | 4/2019 | Han |
| 2019/0120356 A1 | 4/2019 | Han |
| 2019/0120357 A1 | 4/2019 | Han |
| 2019/0225092 A1* | 7/2019 | Li ........................ B60L 58/18 |
| 2020/0062114 A1 | 2/2020 | Holmes et al. |
| 2020/0070638 A1 | 3/2020 | Flaxman |
| 2020/0384806 A1 | 12/2020 | Falls et al. |
| 2021/0102607 A1 | 4/2021 | Ghatti et al. |
| 2021/0138885 A1 | 5/2021 | Engerman |
| 2021/0178813 A1 | 6/2021 | Stoecker et al. |
| 2021/0245599 A1 | 8/2021 | Mepham et al. |

FOREIGN PATENT DOCUMENTS

| | | |
|---|---|---|
| CN | 1026255961 A | 8/2012 |
| CN | 204011518 U | 12/2014 |
| CN | 204167947 U | 2/2015 |
| CN | 105103365 A | 11/2015 |
| CN | 105745548 A | 7/2016 |
| CN | 106532176 A | 3/2017 |
| CN | 107925260 A | 4/2018 |
| CN | 108215786 A | 6/2018 |
| CN | 109808479 A | 5/2019 |
| EP | 2320537 A2 | 5/2011 |
| JP | H05-193366 A | 8/1993 |
| JP | H07-192774 A | 7/1995 |
| JP | 2001-1774 A | 1/2001 |
| JP | 2005-231428 A | 9/2005 |
| JP | 2011-101572 A | 5/2011 |
| JP | 2013-202946 A | 10/2013 |
| JP | 2013-224139 A | 10/2013 |
| JP | 2014-147201 A | 8/2014 |
| JP | 2016-91604 A | 5/2016 |
| KR | 20120096396 A | 8/2012 |
| KR | 2013-0092261 A | 8/2013 |
| KR | 2017-0010727 A | 2/2017 |
| KR | 2017-0110678 A | 10/2017 |
| KR | 101902368 | 10/2018 |
| WO | WO-2008076040 A1 | 6/2008 |
| WO | WO-2008095313 A1 | 8/2008 |
| WO | WO-2008111962 A1 | 9/2008 |
| WO | WO-2011061571 A1 | 5/2011 |
| WO | WO-2017114422 A1 | 7/2017 |

OTHER PUBLICATIONS

USPTO Non Final Office Action for U.S. Appl. No. 16/892,410 dated Dec. 29, 2021.
International Search Report and Written Opinion for Application No. PCT/US2020/036036 dated Oct. 2, 2020.
European Patent Office (ISA), International Search Report and Written Opinion for PCT Application No. PCT/US2020/036029, mailed Oct. 15, 2020.
European Patent Office (ISA), International Search Report and Written Opinion for PCT Application No. PCT/US2020/050080, mailed Nov. 16, 2020.
Japanese Patent Office, Office Action for corresponding JP Application No. 2021-572396 mailed Feb. 20, 2023.
European Patent Office, Examination Report for Corresponding EP Application No. 20 747 263.0 mailed Dec. 23, 2022.
China Intellectual Property Administration, First Office Action for Corresponding CN Application No. 20208004487.1 mailed Feb. 22, 2023.
KIPO office action for corresponding KR Application No. 10-2021-7042902 dated Sep. 6, 2023.
Japanese Patent Office, Office Action for corresponding JP Application No. 2021-572398 mailed Mar. 13, 2023.
Japanese Patent Office, Office Action for corresponding JP Application No. 2021-572397 mailed Mar. 20, 2023.
Japanese Patent Office, Office Action for corresponding JP Application No. 2022-541910 mailed Mar. 13, 2023.
Korean Intellectual Property Office, Office Action for corresponding KR Application No. 10-2022-7000166 mailed May 9, 2023.
USPTO Non Final Office Action for U.S. Appl. No. 17/016,233 dated Mar. 3, 2023.
European Patent Office, Examination Report for Corresponding EP Application No. 20 747 493.3 mailed Nov. 21, 2023.
KIPO office action for corresponding KR Application No. 10-2022-7011195 dated Dec. 9, 2023.
China Intellectual Property Administration, Office Action for Corresponding CN Application No. 202080041487.1 mailed Dec. 29, 2023.
China Intellectual Property Administration, Office Action for Corresponding CN Application No. 202080041504.1 mailed Dec. 29, 2023.
China Intellectual Property Administration, Office Action for Corresponding CN Application No. 202080041516.4 mailed Dec. 26, 2023.
China Intellectual Property Administration, Office Action for Corresponding CN Application No. 202080063157.2 mailed Jan. 9, 2024.

(56) References Cited

OTHER PUBLICATIONS

Israel Patent Office, Office Action for Corresponding IL Application No. 291104 mailed May 2, 2024.
Korean Intellectual Property Office, Office Action for corresponding KR Application No. 10-2022-7000166 mailed Apr. 5, 2024.

* cited by examiner

VEHICLE FRAME AND POWER SUPPLY ASSEMBLY AND RELATED SYSTEMS AND METHODS

CROSS REFERENCE TO RELATED APPLICATION

This application claims priority under 35 U.S.C. § 119(e) to U.S. Provisional Patent Application Ser. No. 62/857,689 filed Jun. 5, 2019, the disclosure of which is hereby incorporated by reference in its entirety.

FIELD

The present disclosure relates generally to a vehicle frame and power supply assembly, and more particularly to a vehicle power supply assembly including a power supply control system and method.

BACKGROUND

This section provides background information related to the present disclosure and is not necessarily prior art.

Conventional vehicle frames often include two or more side members extending along a length of the vehicle, and two or more cross members extending between the side members and along a width of the vehicle. The side members and cross members are often formed from steel, or another suitably strong and durable material, to support, and provide protection for, the vehicle's components and occupants. For example, the side members or cross members may be constructed from a material that exhibits sufficient strength and durability to support a power supply, such as a battery or a battery pack assembly. In this regard, a conventional vehicle frame often includes one or more brackets coupled to the side members or the cross members for attaching a battery pack or other vehicle component to the frame assembly. Often, the manner of assembling the various components to the vehicle frame may not provide the desired level of support and protection for each of the components. While known vehicle frame assemblies and power supply assemblies have proven suitable for their intended purposes, there remains a need for improvement in the pertinent art.

SUMMARY

This section provides a general summary of the disclosure, and is not a comprehensive disclosure of its full scope or all of its features.

One aspect of the disclosure provides a system that includes data processing hardware and memory hardware. The memory hardware is in communication with the data processing hardware and stores instructions that when executed on the data processing hardware cause the data processing hardware to perform certain operations. The operations include receiving a temperature corresponding to a battery, and determining whether the temperature is greater than a predetermined threshold temperature. The operations also include, when the temperature is greater than the predetermined threshold temperature, actuating an ejector to eject the battery from a power supply assembly.

Implementations of the disclosure may include one or more of the following optional features. In some implementations, the ejector includes a fastener. The fastener may include an explosive bolt.

In some implementations, the operations further include receiving a state of function of the battery, and determining whether the state of function is greater than a predetermined threshold state of function. When the state of function is less than the predetermined threshold state of function, the operations may include actuating a switch to remove the battery from a circuit.

In some implementations, the battery is arranged in a parallel circuit with another battery.

In some implementations, the system has a first system voltage prior to ejecting the battery, and a second system voltage after ejecting the battery. The first system voltage may be equal to the second system voltage.

Another aspect of the disclosure provides a power supply system. The power supply system includes a housing, a first battery, a second battery, and a circuit controller. The first battery is at least partially disposed within the housing and has a first switch. The second battery is at least partially disposed within the housing and arranged in a parallel circuit with the first battery. The second battery has a second switch. The first switch and the second switch are operable to remove the first battery or the second battery, respectively, from the circuit. The circuit controller in communication with the first switch and the second switch and operable to receive a first state of function from the first battery and a second state of function from the second battery, the circuit controller configured to actuate the first switch based on the first state of function or the second switch based on the second state of function.

This aspect may include one or more of the following optional features.

In some implementations, the power supply system includes an ejector controller. The ejector controller may be configured to receive a first temperature of the first battery and a second temperature of the second battery. The ejector controller may further be operable to eject the first battery or the second battery from the housing based on the first temperature or the second temperature.

Another aspect of the disclosure provides a control system. The control system includes a charge controller, and a circuit controller. The charge controller determines a first state of function of a first battery and a second state of function of a second battery. The second battery is arranged in a parallel circuit with the first battery. The circuit controller compares (i) the first state of function to a threshold state of function and (ii) the second state of function to the threshold state of function. The circuit controller actuates a switch to remove the first battery from the circuit when the first state of function is less than a threshold state of function.

This aspect may include one or more of the following optional features.

In some implementations, an ejector controller receives a first temperature of the first battery and a second temperature of the second battery. The ejector controller may be operable to eject the first battery or the second battery from a housing based on the first temperature or the second temperature.

Another aspect of the disclosure provides a vehicle power supply assembly. The power supply assembly includes a vehicle frame, a first battery, and a second battery. The vehicle frame includes a first longitudinal member, a second longitudinal member, a first lateral wall, and a second lateral wall. The second longitudinal member is disposed proximate the first longitudinal member. The first lateral wall extends between the first longitudinal member and the second longitudinal member. The second lateral wall extends between the first longitudinal member and the second longitudinal member. The first or second longitudinal walls and/or the first or second lateral walls collectively define a plurality of subchambers. The first battery is removably disposed within a first subchamber of the plurality of subchambers. The second battery is removably disposed within a second subchamber of the plurality of subchambers.

This aspect may include one or more of the following optional features.

In some implementations, the first battery is electrically coupled to the second battery in a series arrangement.

In some implementations, the first battery is electrically coupled to the second battery in a parallel arrangement.

In some implementations, the power supply assembly includes a top wall extending between the first and second longitudinal members and the first and second lateral walls. The first and second longitudinal members and the first and second lateral walls may be disposed between the top wall and a ground surface.

In some implementations, the first and second batteries are electrically coupled to the top wall.

In some implementations, the first and second batteries are in communication with a control module through the top wall.

In some implementations, the power supply assembly includes a cover removably coupled to the housing.

In some implementations, the cover is configured to fluidly isolate the subchambers from an atmosphere surrounding the housing.

In some implementations, the first subchamber is in fluid communication with the second subchamber through a chamber.

Another aspect of the disclosure provides a vehicle power supply assembly. The vehicle power supply assembly includes a vehicle frame assembly, a first battery, and a second battery. The vehicle frame assembly includes a first longitudinal member, a second longitudinal member, a first cross member, a second cross member, and a third cross member. The second longitudinal member is disposed proximate the first longitudinal member. The first cross member extends between the first longitudinal member and the second longitudinal member. The second cross member extends between the first longitudinal member and the second longitudinal member. The third cross member extends between the first longitudinal member and the second longitudinal member. The third cross member is disposed between the first cross member and the second cross member. The first and second longitudinal members and the first, second, and third cross members collectively define a plurality of subchambers. The first battery is removably disposed within a first subchamber of the plurality of subchambers. The second battery is removably disposed within a second subchamber of the plurality of subchambers.

This aspect may include one or more of the following optional features.

In some implementations, the first longitudinal member, the second longitudinal member, the first cross member, the second cross member, and the third cross member form a monolithic construct.

In some implementations, the first battery is electrically coupled to the second battery in a series arrangement.

In some implementations, the first battery is electrically coupled to the second battery in a parallel arrangement.

In some implementations, the power supply assembly includes a top wall extending between the first, second, and third cross members. The first, second, and third cross members may be disposed between the top wall and a ground surface. The first and second batteries may be electrically coupled to the top wall. The first and second batteries may be in communication with a control module through the top wall.

In some implementations, the power supply assembly includes a cover removably coupled to at least one of the first, second, or third cross members. The cover may be configured to fluidly isolate the first and second subchambers from an atmosphere surrounding the first and second subchambers.

In some implementations, the first subchamber is in fluid communication with the second subchamber through a chamber.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected configurations and not all possible implementations, and are not intended to limit the scope of the present disclosure.

Corresponding reference numerals indicate corresponding parts throughout the drawings.

DETAILED DESCRIPTION

Figure 1:
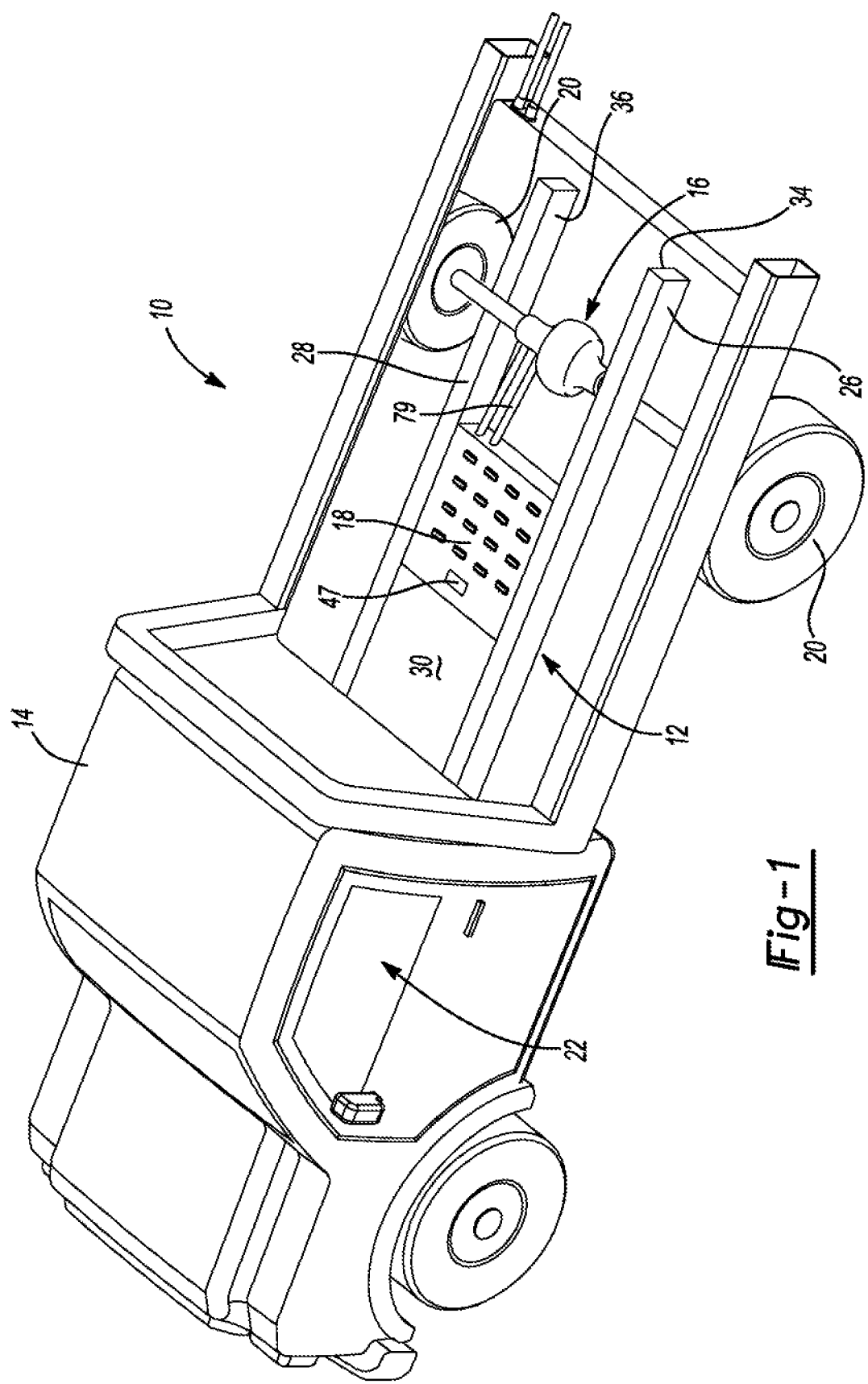
FIG. 1 is a perspective view of a vehicle including a vehicle frame and power supply assembly in accordance with the principles of the present disclosure.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms first, second, third, etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

Referring to FIG. 1, a vehicle 10 is illustrated and includes a frame assembly 12, a body 14, a motor 16, a power supply assembly 18, and a plurality of wheels 20. While the vehicle 10 is generally illustrated as being a commercial utility vehicle, it will be appreciated that the vehicle 10 may include other types of vehicles (e.g., passenger car, van, truck, etc.) within the scope of the present disclosure. In this regard, the frame assembly 12 may be coupled to, or otherwise support, the body 14, the motor 16, the power supply assembly 18, and/or the wheels 20, while the body 14 may define a passenger compartment 22 for housing one or more occupants or users of the vehicle 10.

Figure 2:
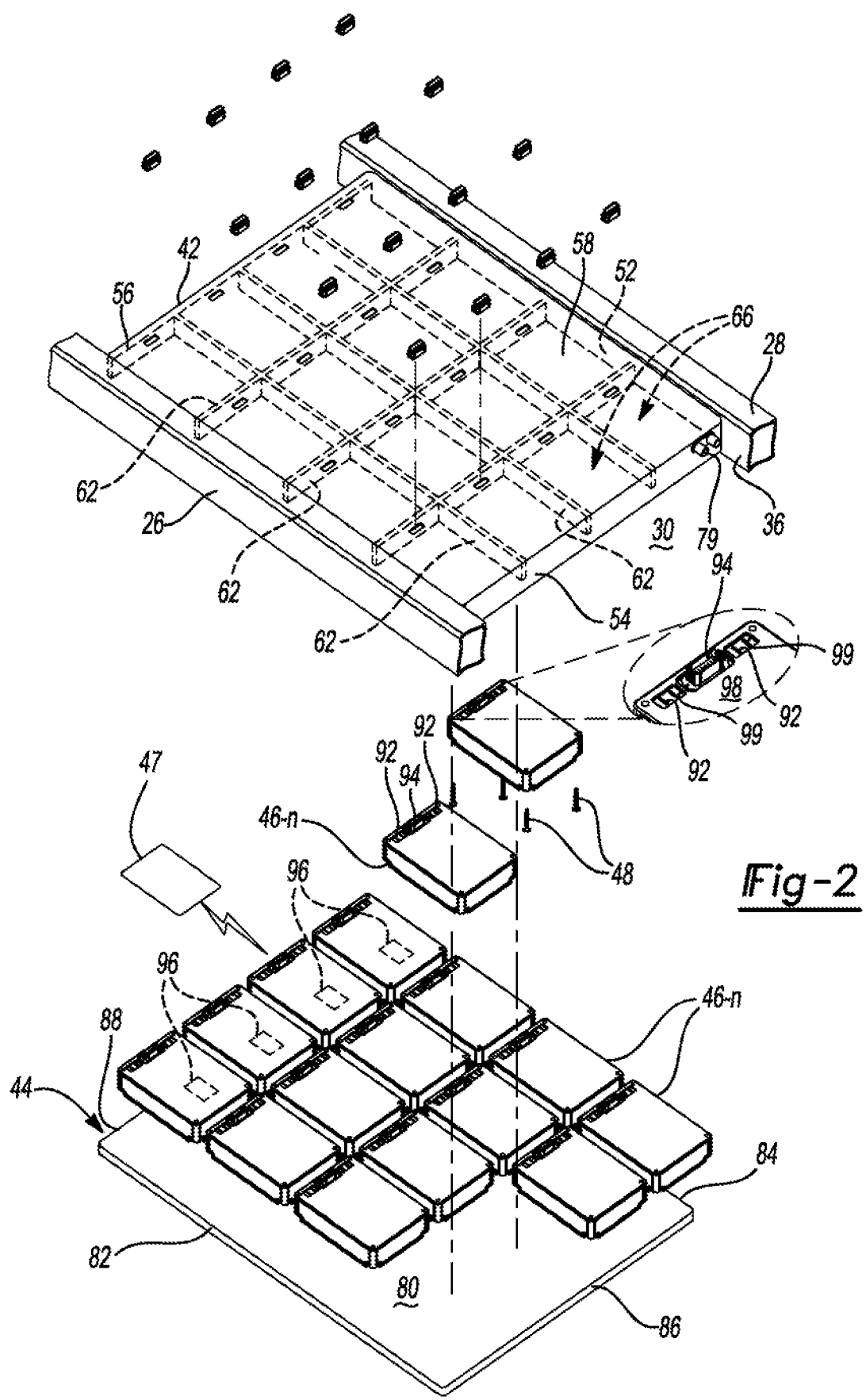
FIG. 2 is a partially exploded top perspective view of a portion of the vehicle frame and power supply assembly of FIG. 1.
Figure 3:
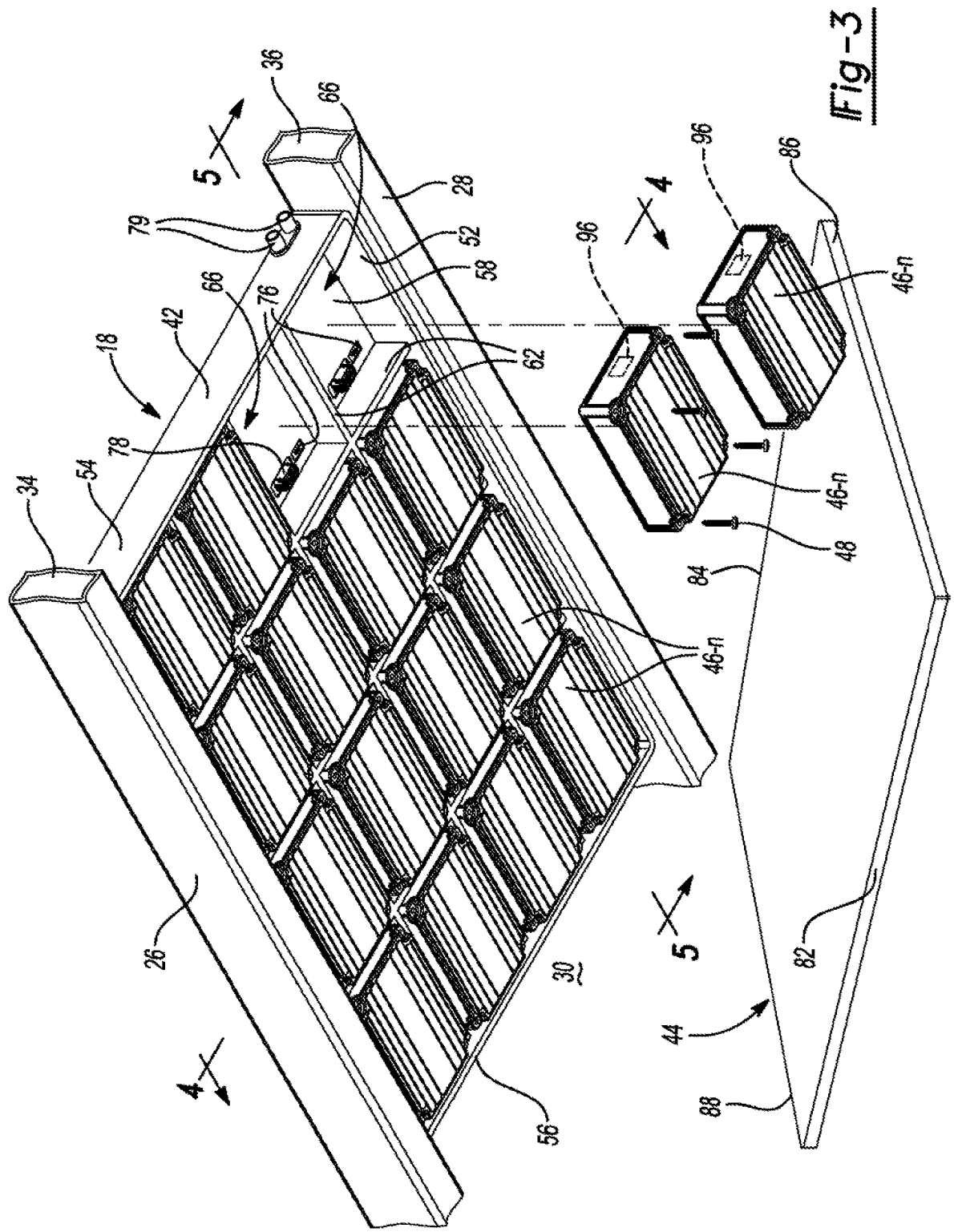
FIG. 3 is a partially exploded bottom perspective view of a portion of the vehicle frame and power supply assembly of FIG. 1.
Figure 4:
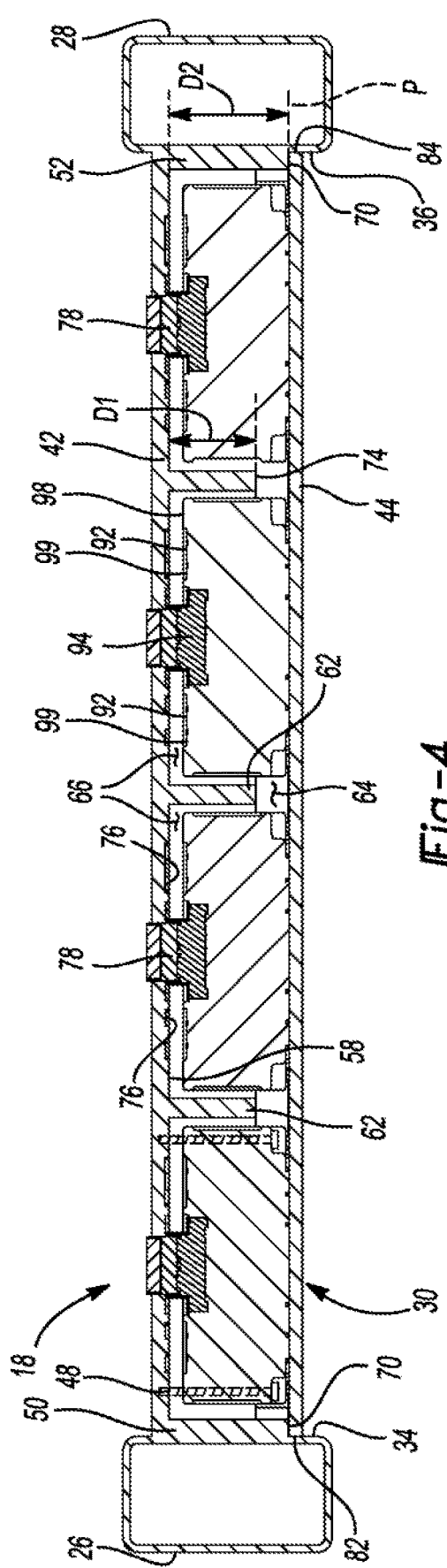
FIG. 4 is a cross-sectional view of the vehicle frame and power supply assembly of FIG. 1 taken along the line 4-4 of FIG. 3.

As illustrated in FIGS. 2-4, the frame assembly 12 may include a first longitudinal member 26 and a second longitudinal member 28. While the frame assembly 12 is generally shown and described herein as including two longitudinal members 26, 28, it will be appreciated that the frame assembly 12 may include more than two longitudinal members within the scope of the present disclosure. The first and second longitudinal members 26, 28 may define a void 30 therebetween. In some implementations, at least a portion of the first longitudinal member 26 extends in a direction substantially parallel to the second longitudinal member 28.

With reference to at least FIG. 4, the first longitudinal member 26 may include a first side wall 34, and the second longitudinal member 28 may include a second side wall 36 facing the first side wall 34, such that the first and second side walls 34, 36 define the void 30. In some implementations, the first and second side walls 34, 36 each define a substantially planar surface. The planar surface of the first side wall 34 may be substantially parallel to the planar surface of the second side wall 36 such that the void 30 defines an elongated cuboid shape.

Figure 5:
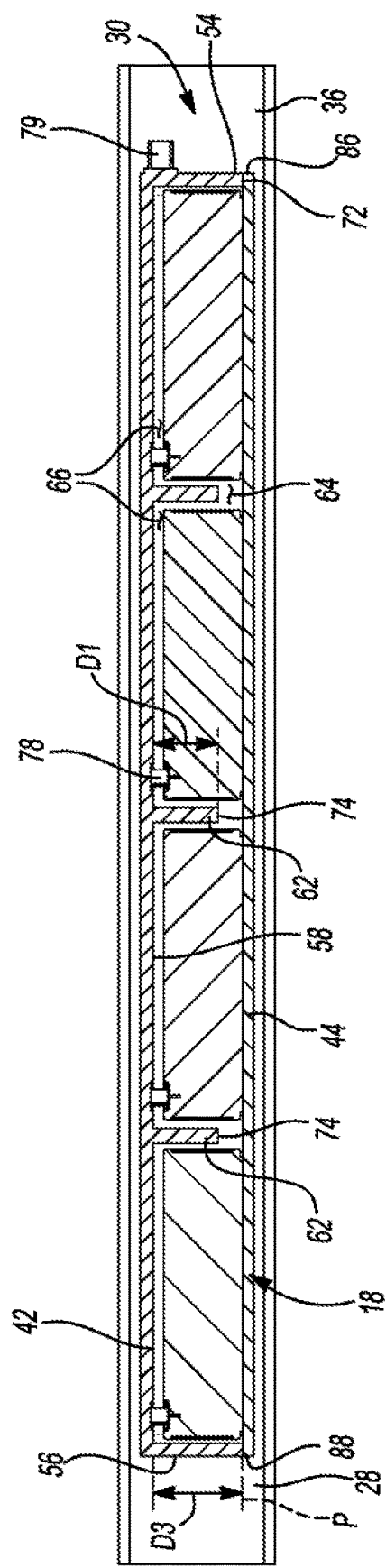
FIG. 5 is a cross-sectional view of the vehicle frame and power supply assembly of FIG. 1 taken along the line 5-5 of FIG. 3.

As illustrated in FIGS. 4 and 5, the power supply assembly 18 may include a housing 42, a cover 44, a plurality of batteries 46-n, a power supply control module 47, one or more fasteners 48, and a plurality of sensors 49-1, 49-2, . . . . 49-n. As will be described in more detail below, the power supply assembly 18 may be integrally formed with the frame assembly 12.

The housing 42 may include a first longitudinal wall 50, a second longitudinal wall 52, a first lateral wall 54 extending from the first longitudinal wall 50 to the second longitudinal wall 52, a second lateral wall 56 extending from the first longitudinal wall 50 to the second longitudinal wall 52, a top wall 58 extending from the first longitudinal wall 50 to the second longitudinal wall 52 and from the first lateral wall 54 to the second lateral wall 56, and a plurality of cross members 62 extending between the first and second longitudinal walls 50, 52 and the first and second lateral walls 54, 56. In some implementations, the first longitudinal wall 50 is substantially parallel to the second longitudinal wall 52, and the first lateral wall 54 is substantially parallel to the second lateral wall 56, such that the first and second longitudinal walls 50, 52 and the first and second lateral walls 54, 56 define a substantially rectangular shape, and the first and second longitudinal walls 50, 52, the first and second lateral walls 54, 56, and the top wall 58 collectively define a chamber 64. In some implementations, the housing 42 is monolithically formed with the frame assembly 12. For example, the first longitudinal wall 50, the second longitudinal wall 52, the first lateral wall 54, and/or the second lateral wall 56 are integrally (e.g., monolithically) formed with the frame assembly 12. In some implementations, the first longitudinal wall 50 and the first longitudinal member 26 form a first unitary frame member of the frame assembly 12, while the second longitudinal wall 52 and the second longitudinal member 28 form a second unitary member of the frame assembly 12.

The cross members 62 may extend laterally or longitudinally between the first and second longitudinal walls 50, 52 and the first and second lateral walls 54, 56, such that the cross-members 62, the first or second longitudinal walls 50, 52, or the first or second lateral walls 54, 56 define a plurality of subchambers 66 within the chamber 64. For example, one or more of the cross members 62 may extend laterally between the first and second longitudinal walls 50, 52, and one or more of the cross members 62 may extend longitudinally between the first and second lateral walls 54, 56. The laterally-extending cross members 62 may be substantially perpendicular to the longitudinally-extending cross members 62. The subchambers 66 may face, or otherwise be exposed to, a ground surface with which the wheels 20 of the vehicle 10 are engaged. In this regard, during operation of the vehicle 10, the walls 50, 52, 54, 56 and the cross members 62 may be disposed between the top wall 58 and the ground surface with which the wheels 20 of the vehicle 10 are engaged.

As illustrated, in some implementations, three cross members 62 extend laterally between the first and second longitudinal walls 50, 52 and three cross members 62 extend longitudinally between the first and second lateral walls 54, 56, such that the cross-members 62, the first and second longitudinal walls 50, 52, and the first and second lateral walls 54, 56 define a grid of sixteen subchambers 66 within the chamber 64. It will be appreciated, however, that the housing 42 may include more or less than three cross members 62 extending laterally between the first and second longitudinal walls 50, 52 and more or less than three cross members 62 extending longitudinally between the first and second lateral walls 54, 56 within the scope of the present disclosure, such that the housing 42 includes more or less than sixteen subchambers 66. As previously described, in some implementations, the cross members 62 are integrally (e.g., monolithically) formed with the frame assembly 12. For example, the cross members 62 and the first and/or second longitudinal members 26, 28 may form unitary first and/or second frame members of the frame assembly 12.

One or more of the cross members 62 may extend a distance D1 from the top wall 58, one or more of the first or second longitudinal walls 50, 52 may extend a distance D2 from the top wall 58, and one or more of the first or second lateral walls 54, 56 may extend a distance D3 from the top wall 58. In some implementations, the distance D1 is equal to the distances D2 and D3 such that a distal end 70, 72, 74 of the first and second longitudinal walls 50, 52, the first and second lateral walls 54, 56, and the cross members 62, respectively, collectively define, or are otherwise disposed within a plane P. In other implementations, the distance D1 may be less than the distances D2 or D3, such that the distal ends 70, 72 of the first and second longitudinal walls 50, 52 and the first and second lateral walls 54, 56, respectively, are disposed in the plane P, and the distal ends 74 of the cross members 62 are disposed between the plane P and the top wall 58.

With reference to FIGS. 3 and 4, the top wall 58 of the housing 42 may further include a plurality of connectors 76 for electrically coupling each power supply assembly 18 to the housing 42, and a plurality of connectors 78 for communicatively coupling each power supply assembly 18 to the housing 42. As will be described in more detail below, in some implementations, at least one of the connectors 76 and at least one connectors 78 is disposed within each of the subchambers 66 to communicate with the batteries 46-$n$ and provide for the transfer of electricity and data, respectively, from the batteries 46-$n$ to other areas or components (e.g., the body 14 or the motor 16) of the vehicle 10. In this regard, one of the connectors 76 may include a positive terminal, and another of the connectors 76 may include a negative terminal. The housing 42 may further include one or more conduits 79 for transmitting electricity and data from the batteries 46-$n$ to the connectors 76, 78, respectively, and to other areas or components (e.g., the body 14 or the motor 16) of the vehicle 10. For example, the conduits 79 may include wires, optical elements, or other transmission means for transmitting electricity, data from the batteries 46-$n$ to the connectors 76, 78, respectively, and to other areas or components (e.g., the body 14 or the motor 16) of the vehicle 10. In some implementations, the conduits 79 may transmit a fluid for cooling, or otherwise maintaining a desired temperature of, the batteries 46-$n$. In some implementations, the housing 42 may include one or more busbars or headers for transmitting electricity or data from the connectors 76, 78 to the conduits 79. As previously described, the power supply assembly 18, including the conduits 79, may be integrally formed with the frame assembly 12, such that a user can handle the power supply assembly 18 (e.g., the batteries 46-$n$) without engaging any high voltage components.

The cover 44 may define a substantially planar construct having an upper surface 80, first and second longitudinal ends 82, 84, and first and second lateral ends 86, 88. A distance between the first and second longitudinal ends 82, 84 may be substantially equal to a distance between the first and second longitudinal walls 50, 52 of the housing 42, while a distance between the first and second lateral ends 86, 88 may be substantially equal to a distance between the first and second lateral walls 54, 56 of the housing 42. Accordingly, in an assembled configuration, the first and second longitudinal walls 82, 84 of the cover 44 may engage (e.g., sealingly) the distal ends 66 of the first and second longitudinal walls 50, 52, and the first and second lateral walls 54, 56 may engage (e.g., sealingly) the distal ends 72 of the first and second lateral walls 54, 56 of the housing 42. In some implementations, the upper surface 80 engages (e.g., sealingly) the cross members 62. As will be described in more detail below, engagement of the cover 44 with the first and second longitudinal walls 82, 84, the first and second lateral walls 54, 56, or the cross members 62 may fluidly isolate, and insulate, the chamber 64 and the subchambers 66 from the environment surrounding the housing 42.

As illustrated in FIG. 4, in some implementations, the fasteners 48 are coupled to the housing 42 and the batteries 46-$n$. For example, each fastener 48 may be coupled to the top wall 58 within each subchamber 66 and to a corresponding battery 46-$n$ disposed within the subchamber 66. As will be described in more detail below, during operation, the fasteners 48 may communicate with the power supply control module 47 to eject one or more of the batteries 46-$n$ from the subchamber 66 in which the battery 46-$n$ is located. For example, upon the occurrence of a predetermined event (e.g., determining that a battery 46-$n$ is no longer functional, or that a temperature of the battery 46-$n$ is greater than a predetermined threshold temperature), the power supply control module 47 may communicate with the fastener 48 corresponding to the battery 46-$n$, or the subchamber 66 in which the battery 46-$n$ is disposed, to eject the battery 46-$n$ from the subchamber 66. In some implementations, the power supply control module 19 may actuate (e.g., explode) the fastener 48, or otherwise cause the fastener 48 to no longer engage the housing 42 and/or the battery 46-$n$, such that the battery 46-$n$ is released from the subchamber 66. For example, upon actuation or other failure of the fastener 48, the battery 46-$n$ may fall from the subchamber 66 due to the effect of gravity on the battery 46-$n$.

Figure 6:
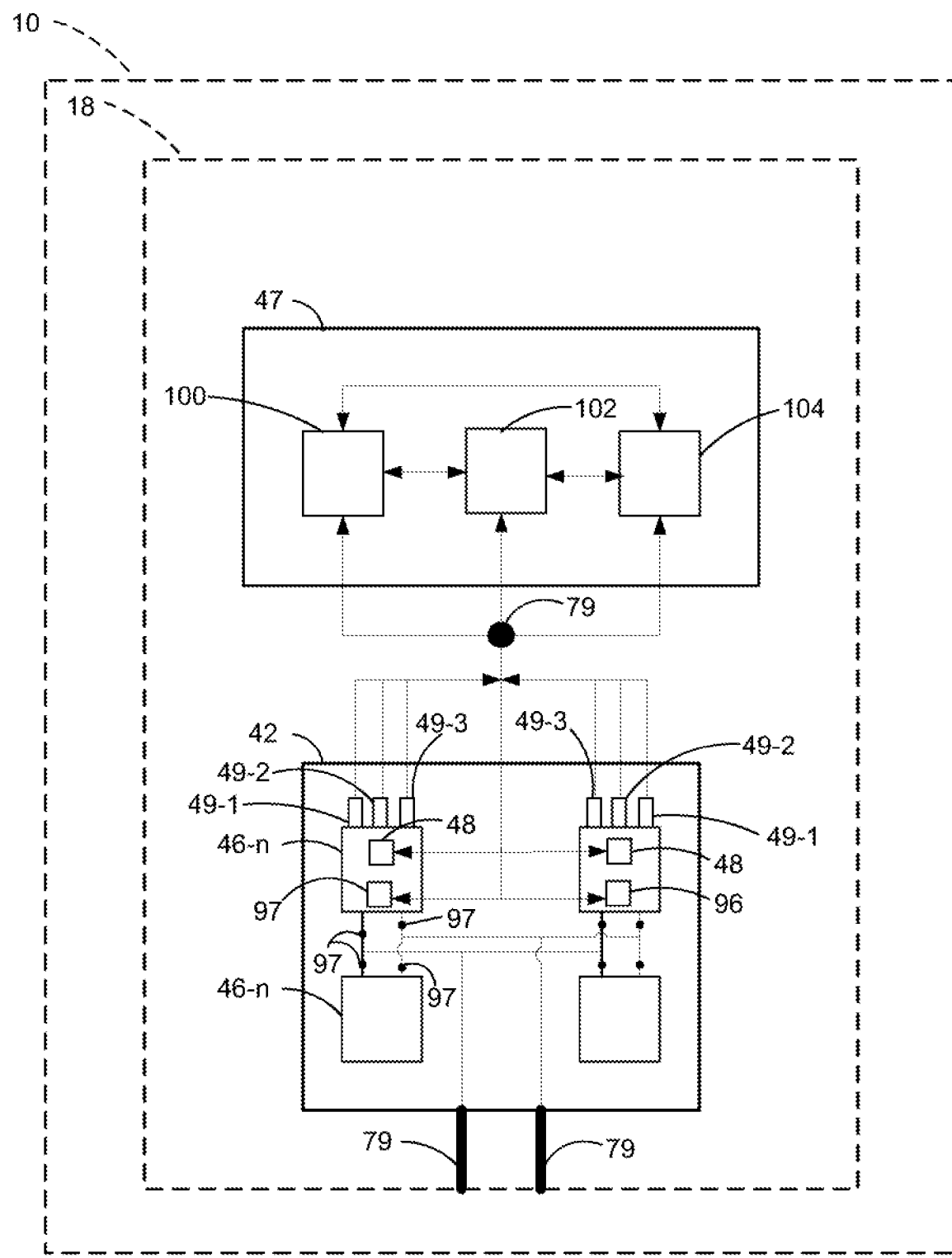
FIG. 6 is a functional block diagram of an example power supply control module in accordance with the principles of the present disclosure.

With reference to FIG. 6, the sensors 49-1, 49-2, . . . 49-$n$ may include a plurality of electrical current sensors 49-1, a plurality of voltage sensors 49-2, and a plurality of temperature sensors 49-3. In this regard, each battery 46-$n$, or each subchamber 66 within which each battery 46-$n$ is disposed, may include a current sensor 49-1, a voltage sensor 49-2, and a temperature sensor 49-3 to determine the current, voltage, and temperature corresponding to the particular battery 46-$n$ disposed within each subchamber 66 at any given time. As will be described in more detail below, the sensors 49-1, 49-2, . . . 49-$n$ may transmit the sensed information (e.g., current, voltage, temperature, etc.) to the power supply control module 47 to manage the use of electrical power from the particular battery 46-$n$ and the power supply assembly 18, generally.

With reference to FIGS. 2 and 4, each battery 46-$n$ may include one or more electrical connectors 92, one or more data connectors 94, a switch 96, and one or more insulated-gate bipolar transistors (IGBT) 97. For example, as illustrated in FIG. 4, in some implementations, each battery 46-$n$ includes two electrical connectors 92 (e.g., a positive terminal and a negative terminal) and one data connector 94. As illustrated in FIGS. 2 and 4, in some implementations, the batteries 46-$n$ each include an outer surface 98 having one or more recesses 99. Each connector 92 may be disposed within one of the recesses 99. In particular, an entirety of the connector 92 may be disposed in one of the recesses 99 such that an entirety of the connector 92 is recessed relative to the outer surface 98. In this way, during use, the batteries 46-*n* can be removed from the subchambers 66 in a safe manner and without the user having to engage the connectors 92. The IGBT 97 may be disposed between (e.g., electrically) the batteries 46-*n* and the conduits 79. In some implementations, the IGBTs 97 are disposed upstream (e.g., electrically) of the conduits 79 and downstream of the connectors 92. In some implementations, the IGBTs 97 are disposed within the batteries 46-*n*. As will be explained in more detail below, during use, the power supply control module 47 may communicate with the IGBTs 97 to prevent electrical communication between the corresponding battery 46-*n* and the conduits 79 until the power supply assembly 18 has achieved a desired system voltage. For example, the IGBTs 97 may allow a user to couple a battery 46-*n* having less than a desired state of function or state of health to the power supply assembly 18 without adversely affecting the voltage output of the power supply assembly 18.

As will be explained in more detail below, the switch 96 may be in communication with the power supply control module 47 such that, based on the occurrence of a predetermined event, the power supply control module 47 may actuate the switch 96 (e.g., from "ON" to "OFF" or vice versa) to terminate electrical communication between the electrical connectors 92 and the conduits 79. In this regard, actuation of the switch 96 on a battery 46-*n* may remove that battery 46-*n* from the electrical circuit (e.g., parallel electrical circuit) formed by the batteries 46-*n* and thereby prevent electrical communication between that battery 46-*n* and the other batteries 46-*n*.

As illustrated in FIGS. 3-5, in an assembled configuration, the batteries 46-*n* may be disposed within the chamber 64 such that the first and second longitudinal walls 50, 52 and the first and second lateral walls 54, 56 substantially surround at least a portion of each battery 46-*n*. In particular, each battery 46-*n* may be disposed within a subchamber 66 such that the cross members 62, the first and second longitudinal walls 50, 52 or the first and second lateral walls 54, 56 substantially surround at least a portion of each battery 46-*n*.

In some implementations, in this assembled configuration, the batteries 46-*n* may be coupled to the connectors 76, 78 to transfer electricity or data, respectively, from the batteries 46-*n* to other areas or components (e.g., the body 14 or the motor 16) of the vehicle 10. For example, one of the connectors 92 (e.g., a positive terminal) of one or more of the batteries 46-*n* may be coupled to one of the connectors 76, while another of the connectors 92 (e.g., a negative terminal) of one or more of the batteries 46-*n* may be coupled to one of the connectors 76 to transfer electricity from the batteries 46-*n* to another component of the vehicle 10. Similarly, one of the connectors 78 may be coupled one of the connectors 94 of a battery 46-*n* to transfer data from the battery 46-*n* to another component of the vehicle 10. In some implementations, a plurality of the batteries 46-*n* are electrically coupled to one another in a series circuit arrangement. In some implementations, a plurality of the batteries 46-*n* are electrically coupled to one another in a parallel circuit arrangement. In some implementations, a first plurality of the batteries 46-*n* are electrically coupled to one another in a series circuit arrangement, and a second plurality of the batteries 46-*n* are electrically coupled to one another in a parallel circuit arrangement. For example, the first plurality of batteries 46-*n* may be electrically coupled to one another in a series circuit arrangement, and electrically coupled to one or more other batteries 46-*n* in a parallel circuit arrangement.

Referring now to FIG. 6, an example implementation of the power supply control module 47 is illustrated. As will be explained in more detail below, the power supply control module 47 may be in electrical communication with the batteries 46-*n* through the connectors 78, 94 in the housing 42 and the batteries 46-*n*, respectively. In other implementations, the power supply control module 47 may communicate with the batteries 46-*n* through a wireless communication protocol.

The power supply control module 47 may include a charge control module 100, a circuit control module 102, and an ejector control module 104. The charge control module 100 may determine a state of health or state of function (e.g., state of charge) of each battery 46-*n*. For example, the charge control module 100 may communicate with each battery 46-*n* to determine whether the battery 46-*n* is fully charged, fully discharged, or at a level between fully charged and fully discharged. In particular, the current sensor 49-1 and the voltage sensor 49-2 corresponding to a particular battery 46-*n* may transmit the electrical current and voltage produced by such battery 46-*n* at any given time to the charge control module 100. Upon determining the state of function of each battery 46-*n*, the charge control module 100 may transmit the state of function of each battery 46-*n* to the circuit control module 102. In some implementations, the charge control module 100 may communicate with the IGBT 97 of a particular battery 46-*n*. For example, the charge control module 100 may instruct the IGBT 97 to prevent electrical communication between the battery 46-*n* and the conduits 79 until a voltage of the assembly 18 has satisfied a predetermined threshold voltage. In particular, if a user couples a battery 46-*n* to the assembly 18, the charge control module 100 may determine voltage of the battery 46-*n* and the other batteries 46-*n* in the assembly and prevent the battery 46-*n* from electrically communicating with the conduits 79 until the voltage of the battery 46-*n* is equal to the voltage of the other batteries 46-*n* in the assembly.

The circuit control module 102 may be in communication with the charge control module 100 and each battery 46-*n*. For example, the circuit control module 102 may be in wired or wireless communication with the switch 96 of each battery 46-*n*. During use, the circuit control module 102 may actuate the switch 96 based on an input received from the charge control module 100. For example, the charge control module 100 may transmit the state of function of each battery 46-*n* to the circuit control module 102, and the circuit control module 102 may actuate the switch 96 of a particular battery 46-*n* if the state of function of the particular battery 46-*n* is less than a predetermined level. In particular, if the state of charge received by the circuit control module 102 for a particular battery 46-*n* indicates that the state of charge of such battery 46-*n* is less than ten percent of a fully charged state, the circuit control module 102 may actuate the switch 96 (e.g., from ON to OFF) to prevent the particular battery 46-*n* from electrically communicating with the conduits 79 through the connectors 76. In this way, the circuit control module 102 is operable to efficiently balance the supply of power from the power supply assembly 18 by bringing batteries 46-*n* into and out of the electrical circuit without impacting the performance of the vehicle 10. For example, the circuit control module 102 may remove batteries 46-*n* from the electrical circuit (e.g., electrical communication with the conduits 79) with only a minimal impact on the voltage produced by the power supply assembly 18 and on the performance of the vehicle 10.

The ejector control module 104 may be in communication with the batteries 46-n and the fasteners 48. For example, the ejector control module 104 may be in wired or wireless communication with the fasteners 48. During use, the ejector control module 104 may actuate the fasteners 48 based on a signal receive from the temperature sensors 49-3. In particular, if the temperature transmitted by the temperature sensor 49-3 to the ejector control module 104 for a particular battery 46-n is greater than a predetermined threshold temperature, the ejector control module 104 may transmit a signal to, and actuate, the fastener 48. In this regard, in some implementations, the ejector control module 104 may cause the fastener 48 to explode, or otherwise fail to engage the battery 46-n or the housing 42, thereby causing the battery 46-n to eject from the subchamber 66 in which the battery 46-n is disposed. For example, upon actuation by the ejector control module 104, the fasteners 48 may explode, thereby allowing the weight of the battery 46-n to cause the battery 46-n to fall, or otherwise be ejected, from subchamber 66. In this way, the ejector control module 104 is operable to efficiently remove a battery 46-n from the power supply assembly 18 while only minimally impacting the performance of the vehicle 10.

During operation of the vehicle 10, when a user desires to replace one of the batteries 46-n, the user may remove the cover 44 from the housing 42 to expose the batteries 46-n within the subchambers 66. The user may then remove the battery 46-n in need of replacement from the subchamber 66, and discard the battery 46-n prior to re-coupling the cover 44 to the housing 42. In some implementations, the batteries 46-n may each have an electrical potential (e.g., voltage) V1. Similarly, operation of the vehicle 10 may require an electric potential V2. The electric potential V1 of the batteries 46-n may be equal to the electric potential V2 required by the vehicle 10. Accordingly, a user may remove batteries 46-n from the housing 42, or add batteries 46-n to the housing 42 to increase the capacity (e.g., available power capacity in Watts), without changing (e.g., without increasing or decreasing) the electrical potential V1. In this regard, after removing batteries 46-n from the housing 42, and after adding batteries 46-n to the housing 42, the electrical potential V1 of the power supply assembly 18 may continue to equal the electrical potential V2 required by the vehicle 10.

The frame assembly 12, including the longitudinal, lateral, and cross-members 50, 52, 54, 56, 62 can help to provide a strong, durable system for supporting one or more batteries 46-n during operation of the vehicle 10 and to ensure an efficient, durable system for providing electricity to the motor 16 or other component of the vehicle 10, while allowing a user to safely and efficiently replace the batteries 46-n. While the power supply assembly 18, including the batteries 46-n, are generally shown and described herein as being incorporated into a vehicle 10, the power supply assembly 18, including the batteries 46-n, may be incorporated into other assemblies (e.g., a home, building or other stationary assembly, a backpack or other mobile application, etc.) within the scope of the present disclosure.

Figure 7:
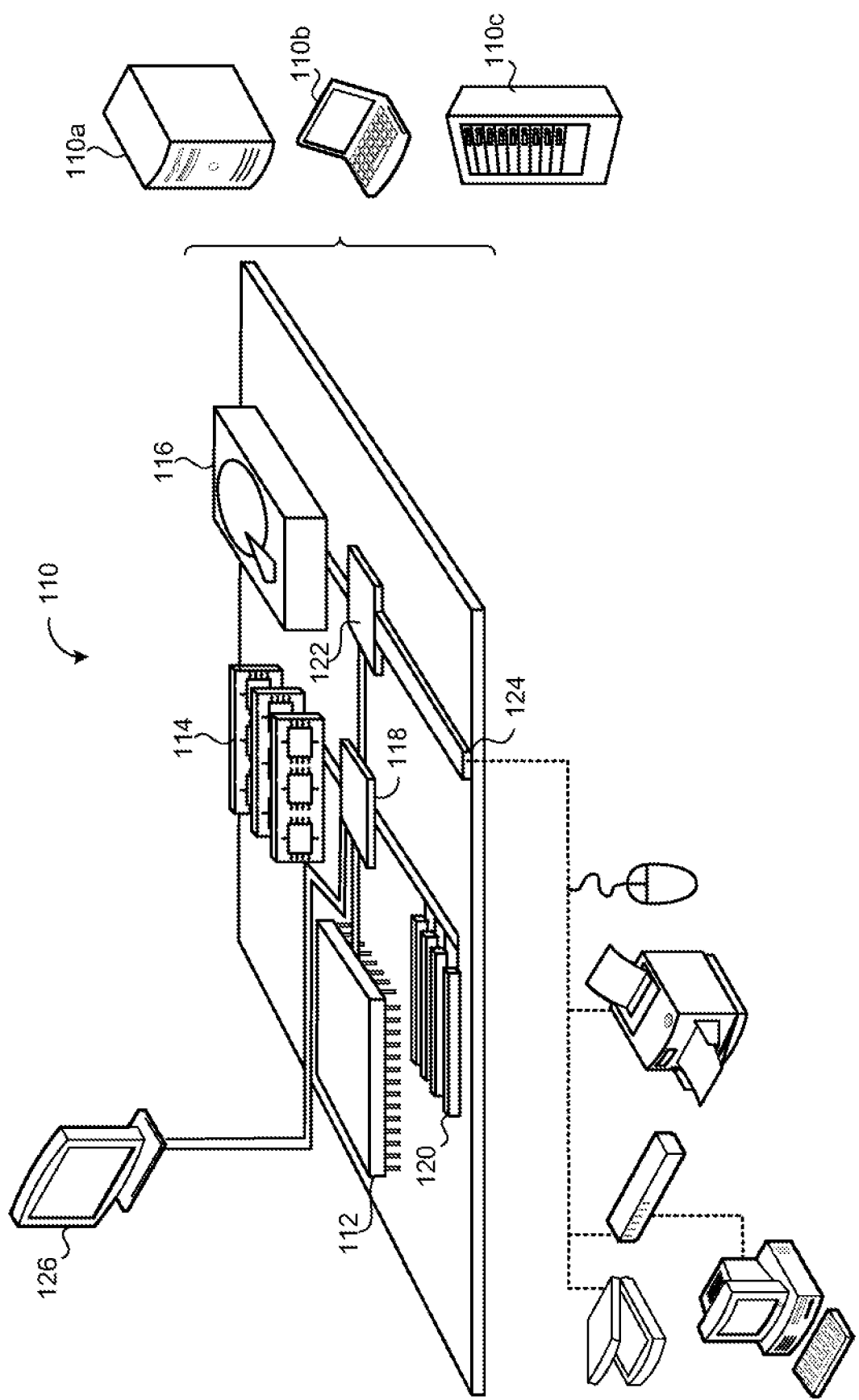
FIG. 7 is a schematic view of an example computing device executing instructions for controlling a power supply assembly in accordance with the principles of the present disclosure.

FIG. 7 is schematic view of an example computing device 110 that may be used to implement the systems and methods described in this document. The computing device 110 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 110 includes a processor 112, memory 114, a storage device 116, a high-speed interface/controller 118 connecting to the memory 114 and high-speed expansion ports 120, and a low speed interface/controller 122 connecting to a low speed bus 124 and a storage device 116. Each of the components 112, 114, 116, 118, 120, and 122, are interconnected using various busses, and may be mounted on a common motherboard or in other manners as appropriate. The processor 112 can process instructions for execution within the computing device 110, including instructions stored in the memory 114 or on the storage device 116 to display graphical information for a graphical user interface (GUI) on an external input/output device, such as display 126 coupled to high speed interface 118. In other implementations, multiple processors and/or multiple buses may be used, as appropriate, along with multiple memories and types of memory. Also, multiple computing devices 110 may be connected, with each device providing portions of the necessary operations (e.g., as a server bank, a group of blade servers, or a multi-processor system).

The memory 114 stores information non-transitorily within the computing device 110. The memory 114 may be a computer-readable medium, a volatile memory unit(s), or non-volatile memory unit(s). The non-transitory memory 114 may be physical devices used to store programs (e.g., sequences of instructions) or data (e.g., program state information) on a temporary or permanent basis for use by the computing device 110. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 116 is capable of providing mass storage for the computing device 110. In some implementations, the storage device 116 is a computer-readable medium. In various different implementations, the storage device 116 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 114, the storage device 116, or memory on processor 112.

The high speed controller 118 manages bandwidth-intensive operations for the computing device 110, while the low speed controller 122 manages lower bandwidth-intensive operations. Such allocation of duties is exemplary only. In some implementations, the high-speed controller 118 is coupled to the memory 114, the display 126 (e.g., through a graphics processor or accelerator), and to the high-speed expansion ports 120, which may accept various expansion cards (not shown). In some implementations, the low-speed controller 122 is coupled to the storage device 116 and a low-speed expansion port 124. The low-speed expansion port 124, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 110 may be implemented in a number of different forms, as shown in the figure. For example, it may be implemented as a standard server 110a or multiple times in a group of such servers 110a, as a laptop computer 110b, or as part of a rack server system 110c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter affecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as an application, program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

One or more aspects of the disclosure can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The following Clauses provide exemplary configurations for a power supply system described above.

Clause 1. A system comprising data processing hardware and memory hardware in communication with the data processing hardware, the memory hardware storing instructions that when executed on the data processing hardware cause the data processing hardware to perform operations comprising: receiving a temperature corresponding to a battery, determining whether the temperature is greater than a predetermined threshold temperature, and when the temperature is greater than the predetermined threshold temperature, actuating an ejector to eject the battery from a power supply assembly.

Clause 2. The system of Clause 1, wherein the ejector includes a fastener.

Clause 3. The system of Clause 2, wherein the fastener includes an explosive bolt.

Clause 4. The system of Clause 1, wherein the operations further comprise: receiving a state of function of the battery, determining whether the state of function is greater than a predetermined threshold state of function, and when the state of function is less than the predetermined threshold state of function, actuating a switch to remove the battery from a circuit.

Clause 5. The system of Clause 4, wherein the battery is arranged in a parallel circuit with another battery.

Clause 6. The system of Clause 1, wherein the system has a first system voltage prior to ejecting the battery, and a second system voltage after ejecting the battery, and wherein the first system voltage is equal to the second system voltage.

Clause 7. A power supply system comprising a housing, a first battery at least partially disposed within the housing and having a first switch, a second battery at least partially disposed within the housing and arranged in a parallel circuit with the first battery, the second battery having a second switch operable to remove the second battery from the circuit, the first switch operable to remove the first battery from the circuit, and a circuit controller in communication with the first switch and the second switch and operable to receive a first state of function from the first battery and a second state of function from the second battery, the circuit controller configured to actuate the first switch based on the first state of function or the second switch based on the second state of function.

Clause 8. The power supply system of Clause 7, further comprising an ejector controller configured to receive a first temperature of the first battery and a second temperature of the second battery, the ejector controller operable to eject the first battery or the second battery from the housing based on the first temperature or the second temperature.

Clause 9. A control system comprising a charge controller that determines a first state of function of a first battery and a second state of function of a second battery arranged in a parallel circuit with the first battery, and a circuit controller that: compares (i) the first state of function to a threshold state of function and (ii) the second state of function to the threshold state of function, and actuates a switch to remove the first battery from the circuit when the first state of function is less than a threshold state of function.

Clause 10. The control system of Clause 9, further comprising an ejector controller that receives a first temperature of the first battery and a second temperature of the second battery, the ejector controller operable to eject the first battery or the second battery from a housing based on the first temperature or the second temperature.

Clause 11. A vehicle power supply assembly comprising a vehicle frame assembly including a first longitudinal member, a second longitudinal member disposed proximate the first longitudinal member, a first lateral wall extending between the first longitudinal member and the second longitudinal member, a second lateral wall extending between the first longitudinal member and the second longitudinal member, the first and second longitudinal members and the first and second lateral walls defining a plurality of subchambers, a first battery removably disposed within a first subchamber of the plurality of subchambers, and a second battery removably disposed within a second subchamber of the plurality of subchambers.

Clause 12. The vehicle power supply assembly of Clause 11, wherein the first battery is electrically coupled to the second battery in a series arrangement.

Clause 13. The vehicle power supply assembly of Clause 11, wherein the first battery is electrically coupled to the second battery in a parallel arrangement.

Clause 14. The vehicle power supply assembly of Clause 11, further comprising a top wall extending between the first and second longitudinal members and the first and second lateral walls.

Clause 15. The vehicle power supply assembly of Clause 14, wherein the first and second longitudinal members and the first and second lateral walls are disposed between the top wall and a ground surface.

Clause 16. The vehicle power supply assembly of Clause 14, wherein the first and second batteries are electrically coupled to the top wall.

Clause 17. The vehicle power supply assembly of Clause 16, wherein the first and second batteries are in communication with a control module through the top wall.

Clause 18. The vehicle power supply assembly of Clause 11, further comprising a cover removably coupled to the vehicle frame assembly.

Clause 19. The vehicle power supply assembly of Clause 18, wherein the cover is configured to fluidly isolate the subchambers from an atmosphere surrounding the vehicle frame assembly.

Clause 20. The vehicle power supply assembly of Clause 11, wherein the first subchamber is in fluid communication with the second subchamber through a chamber.

Clause 21. A vehicle power supply assembly comprising a vehicle frame assembly including a first longitudinal member, a second longitudinal member disposed proximate the first longitudinal member, a first cross member extending between the first longitudinal member and the second longitudinal member, a second cross member extending between the first longitudinal member and the second longitudinal member, a third cross member extending between the first longitudinal member and the second longitudinal member, the third cross member disposed between the first cross member and the second cross member, the first and second longitudinal members and the first, second, and third cross members collectively defining a plurality of subchambers, a first battery removably disposed within a first subchamber of the plurality of subchambers, and a second battery removably disposed within a second subchamber of the plurality of subchambers.

Clause 22. The vehicle power supply assembly of Clause 21, wherein the first battery is electrically coupled to the second battery in a series arrangement.

Clause 23. The vehicle power supply assembly of Clause 21, wherein the first battery is electrically coupled to the second battery in a parallel arrangement.

Clause 24. The vehicle power supply assembly of Clause 21, further comprising a top wall extending between the first, second, and third cross members.

Clause 25. The vehicle power supply assembly of Clause 24, wherein the first, second, and third cross members are disposed between the top wall and a ground surface.

Clause 26. The vehicle power supply assembly of Clause 24, wherein the first and second batteries are electrically coupled to the top wall.

Clause 27. The vehicle power supply assembly of Clause 26, wherein the first and second batteries are in communication with a control module through the top wall.

Clause 28. The vehicle power supply assembly of Clause 21, further comprising a cover removably coupled to at least one of the first, second, or third cross members.

Clause 29. The vehicle power supply assembly of Clause 28, wherein the cover is configured to fluidly isolate the first and second subchambers from an atmosphere surrounding the first and second subchambers.

Clause 30. The vehicle power supply assembly of Clause 21, wherein the first subchamber is in fluid communication with the second subchamber through a chamber.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A system comprising:
a battery disposed in a housing of a power supply assembly, the housing including a conduit that transmits electricity and data from the battery to one or more connectors in the housing;
one or more insulated-gate bipolar transistors (IGBTs) between the battery and the conduit data processing hardware; and
memory hardware in communication with the data processing hardware, the memory hardware storing instructions that when executed on the data processing hardware cause the data processing hardware to perform operations comprising:
  instructing the one or more IGBTs to prevent electrical discharge from the battery until a predetermined threshold system voltage has been met, the one or more IGBTs permitting connection of the battery to the power supply assembly without adversely affecting a voltage output of the power supply assembly if the battery has a state of health that is less than a predetermined threshold state of health;
  receiving a temperature corresponding to the battery;
  determining whether the temperature is greater than a predetermined threshold temperature; and
  when the temperature is greater than the predetermined threshold temperature, actuating an ejector to eject the battery from a power supply assembly.

2. The system of claim 1, wherein the ejector includes a fastener.

3. The system of claim 2, wherein the fastener includes an explosive bolt.

4. The system of claim 1, wherein the operations further comprise:

receiving a state of function of the battery;

determining whether the state of function is greater than a predetermined threshold state of function; and when the state of function is less than the predetermined threshold state of function, actuating a switch to remove the battery from a circuit.

5. The system of claim 4, wherein the battery is arranged in a parallel circuit with another battery.

6. The system of claim 1, wherein the system has a first system voltage prior to ejecting the battery, and a second system voltage after ejecting the battery, and wherein the first system voltage is equal to the second system voltage.

7. A power supply system comprising:

a housing including a first conduit and a second conduit;

a first battery at least partially disposed within the housing and having a first switch;

a second battery at least partially disposed within the housing and arranged in a parallel circuit with the first battery, the second battery having a second switch operable to remove the second battery from the circuit, the first switch operable to remove the first battery from the circuit; and a first insulated-gate bipolar transistors (IGBT) between the first battery and the first conduit and a second IGBT between the second battery and the second conduit;

a circuit controller instructing the first IGBT to prevent electrical discharge from the first battery and the second IGBT to prevent electrical discharge from the second battery until a predetermined threshold system voltage has been met, the first and second IGBTs permitting connection of the first and second batteries to the power supply assembly without adversely affecting a voltage output of the power supply assembly if either the first or second battery has a state of health that is less than a predetermined threshold state of health;

wherein the circuit controller is in communication with the first switch and the second switch and is operable to receive a first state of function from the first battery and a second state of function from the second battery, the circuit controller configured to actuate the first switch based on the first state of function or the second switch based on the second state of function.

8. The power supply system of claim 7, further comprising an ejector controller configured to receive a first temperature of the first battery and a second temperature of the second battery, the ejector controller operable to eject the first battery or the second battery from the housing based on the first temperature or the second temperature.

9. A control system comprising:

a charge controller that determines a first state of function of a first battery and a second state of function of a second battery arranged in a parallel circuit with the first battery, the first and second battery each including one or more insulated-gate bipolar transistors (IGBTs); and a circuit controller that:

instructs the one or more IGBTs to prevent electrical discharge from the first and second batteries until a predetermined threshold system voltage is met, the one or more IGBTs permitting connection of the first and second batteries to a power supply assembly without adversely affecting a voltage output of the power supply assembly if either the first or second battery has a state of health that is less than a predetermined threshold state of health;

compares (i) the first state of function to a threshold state of function and (ii) the second state of function to the threshold state of function; and actuates a switch to remove the first battery from the circuit when the first state of function is less than a threshold state of function.

10. The control system of claim 9, further comprising an ejector controller that receives a first temperature of the first battery and a second temperature of the second battery, the ejector controller operable to eject the first battery or the second battery from a housing based on the first temperature or the second temperature.

* * * * *